March 11, 1930. E. A. SMITH 1,750,366
CABINET DOOR AND MIRROR FRAME
Filed Sept. 7, 1926
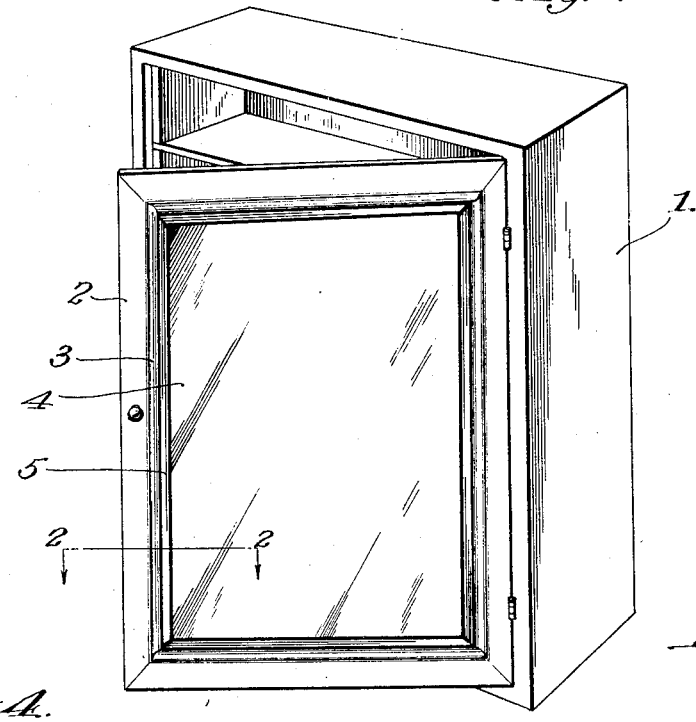
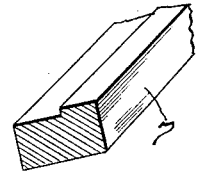
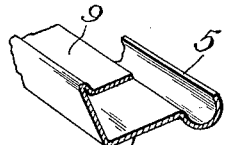
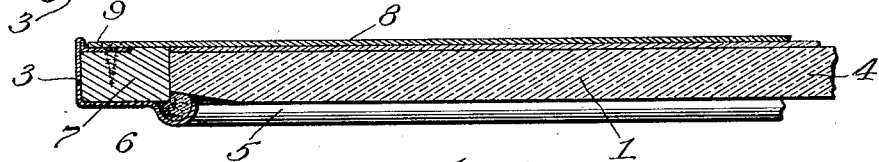
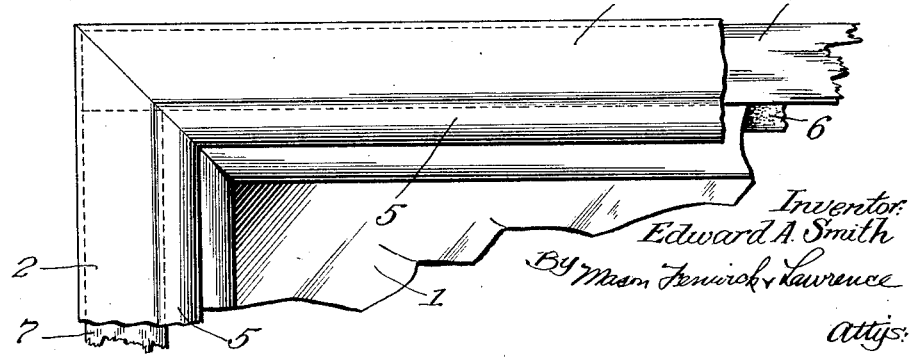
Inventor:
Edward A. Smith
By Mason Fenwick & Lawrence
attys.

Patented Mar. 11, 1930

1,750,366

UNITED STATES PATENT OFFICE

EDWARD A. SMITH, OF CHICAGO, ILLINOIS

CABINET DOOR AND MIRROR FRAME

Application filed September 7, 1926. Serial No. 134,006.

This invention relates to cabinets and mirror frames and more specifically to cabinets containing mirrors or glass panels.

The principal object is to provide a frame which will hold the glass securely and at the same time minimize the danger of cracking or breaking due to any sudden shock or blow. It is very common in connection with the mounting of mirrors or glass panels in cabinets to cut the glass slightly too small or too large. This often results in the first case, in the glass rattling and never being securely fastened, and in the second case, in a tendency for the glass to crack if forced into a frame too small for the glass.

Another object is to provide a flange which will securely hold the glass and at the same time provide means for the expansion or contraction of the flange according to the thickness of the glass.

Other objects will be disclosed in the specifications and claims.

The invention in a preferred form is illustrated in the drawings and hereinafter more fully described.

In the drawings:

Figure 1 is a perspective of a cabinet showing the door partly opened.

Figure 2 is a cross-section taken along lines 2—2 of Figure 1.

Figure 3 is a fragmentary section broken away so as to show one corner.

Figure 4 is a cross-section of the metal frame and

Figure 5 shows a filler to go in the metal frame.

In the drawings like parts are designated by similar numerals.

Numeral 1 designates a cabinet of the common medical type with a door 2 hingedly connected thereto. The door 2 consists of a metal frame 3, in which is mounted a mirror 4. The frame 3 has a flange 5, in which is placed a soft shock absorbing material 6, preferably felt. The mirror 4 presses against the inner face of the shock absorbing material 6. Within the metal frame 3 is a filler material 7, preferably wood, against the bottom edge of which the mirror 4 will rest. On the back side of door 2 is a metal backing 8 which holds the mirror 4 securely in place. The metal backing 8 rests snugly against the back flange 9 of the frame 3. This flange is bent so that the metal backing 8 will lie flush or slightly below flush with the thickness of the frame 3.

By making the frame of metal and having a flange extend below the wood filler, a recess is formed in which may be placed the felt or other material and at the same time the flange, because of its bowed structure, will have a tendency to spring and give. The felt pressing against the mirror, which is held firmly from the rear by the metal back, will absorb any shock and hold the mirror firmly in place to prevent any rattle which would naturally ensue where the glass was not properly fitted. At the same time the glass is not so rigidly held as not to absorb any sudden shock or blow which the mirror may receive. By having the lip overhang, there is enough resiliency to kill or deaden such a blow. Should the glass be very thick, the flange will give outwardly, yet hold the glass securely in place. If the glass is thin, a thicker piece of felt may be placed in the recesses which will force the flange slightly outward and hold the glass tightly in place.

By having the back flange 9 indented from the outer edge of frame 3, the metal backing 8 will not exceed the thickness of the frame 3 and will present a very compact article. The back flange at the same time will retain a certain amount of resiliency and help to absorb shocks which are very common to such doors.

While I have described by invention in a preferred form, it is to be understood that various modifications may be made within the limits of the description and that the parts may be varied in proportion and arrangement as shall be determined by the scope of the following claim.

Having thus described my invention what I claim is:

A frame stock comprising a filler member of substantially rectangular cross section having a recessed part on one face, a one piece metallic member bent longitudinally into substantially U-cross section, with a long leg and a short leg being depressed toward the long leg below the edge of the connecting part and adapted to seat in a recess of the filler member when the latter is positioned within said metallic member and the long leg of said metallic member having an outwardly depressed marginal flange adapted to receive a shock absorbing filler, said marginal flange extending beyond the face of the filler member substantially as specified.

In testimony whereof I affix my signature.

EDWARD A. SMITH.